United States Patent [19]

Fossberg

[11] 3,740,955

[45] June 26, 1973

[54] FLEXIBLE OIL BOOM FOR HIGH SEA

[75] Inventor: Robert A. Fossberg, Montreal, Quebec, Canada

[73] Assignee: Hurum Shipping & Trading Company, Ltd., Montreal, Quebec, Canada

[22] Filed: July 7, 1971

[21] Appl. No.: 160,488

[52] U.S. Cl. .................................................. 61/1 F
[51] Int. Cl. ........................................... E02b 15/04
[58] Field of Search .................... 61/1 F, 5; 210/242

[56] References Cited
UNITED STATES PATENTS

| | | | |
|---|---|---|---|
| 3,184,923 | 5/1965 | Galvaing ................................. | 61/1 F |
| 3,648,463 | 3/1972 | Ayers ..................................... | 61/1 F |
| 3,645,099 | 2/1972 | Saavedra ......................... | 210/242 X |
| 3,537,587 | 11/1970 | Kain ................................... | 61/1 F X |

FOREIGN PATENTS OR APPLICATIONS

| | | | |
|---|---|---|---|
| 2,009,655 | 2/1970 | France ................................... | 61/1 F |

*Primary Examiner*—Jacob Shapiro
*Attorney*—Norris M. Eades, Peter Kirby et al.

[57] ABSTRACT

A flexible oil boom is described which has unique capabilities of being compactly stored and also being extremely stable in heavy seas. The boom includes a curtain wall of sheet material for deploying in a substantially vertical position in the water such that the upper edge is above the water surface and the lower edge is below the water surface. A plurality of substantially vertical stiffening members are positioned in spaced relationship along the length of the curtain wall, these members being arranged in opposed pairs with the curtain wall sandwiched between. Outrigger members are connected on each side of the boom a short distance below the water line and each outrigger has an inner end pivotally connected to a stiffening member and an outer end having a connector for connecting a float thereto. A restraining member allows the outrigger to swing between a downward retracted position adjacent the stiffening member and an operating position substantially perpendicular to the stiffening member. Keel members are pivotally connected to the lower ends of the stiffening members at both sides of the curtain wall and these keels are held by restraining members which allow them to swing between an upper retracted position adjacent the curtain wall and an operating position in which they are upwardly and outwardly inclined.

9 Claims, 4 Drawing Figures

PATENTED JUN26 1973

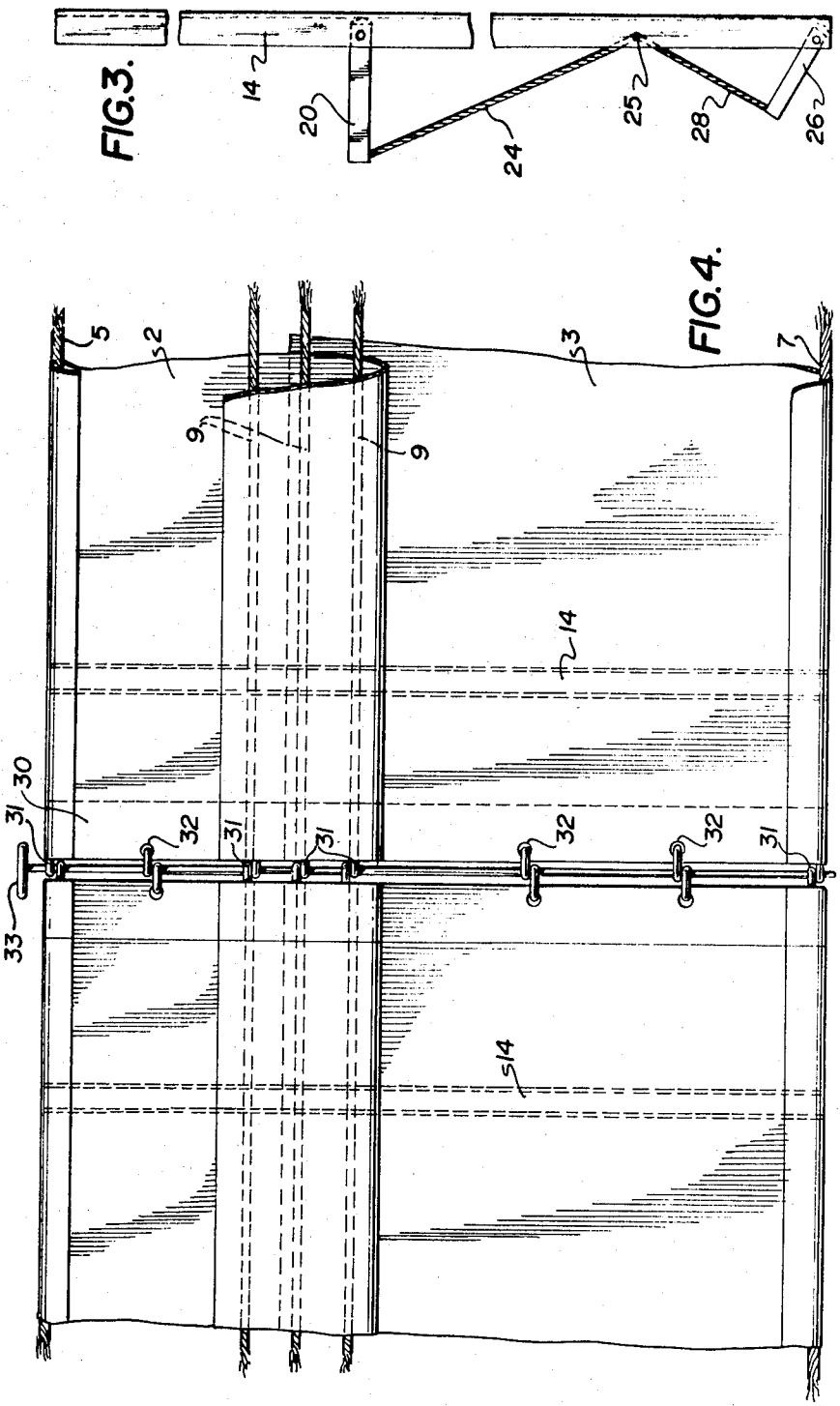

FLEXIBLE OIL BOOM FOR HIGH SEA

This invention relates to a flexible oil boom system for catching and collecting residues, such as oil spills, from the surface of bodies of water.

With the tremendous rate of industrialization that is taking place throughout the world, pollution of bodies of water by oil spills is reaching critical proportions. Not only are major oil spills occurring, such as when an oil tanker is wrecked, but minor oil spills are a daily occurrence throughout the world. Many different systems are being tested for removing the effects of these oil spills and one of the most successful techniques has been to contain the spills by means of booms and then collecting the contained oil from the surface of the water, e.g. by skimmers. Such oil booms can be used not only for containing a major oil spill but they can also be used for isolating terminals with a permanent installation, temporarily encircling tankers while being unloaded and loaded, sweeping port areas for removing floating patches of oil, protecting beaches, etc. In order to provide the necessary versatility, these oil booms must be inexpensive, light and easy to store and handle.

One of the most successful of booms on the market today is in the form of a flexible fabric curtain wall which floats vertically in the water with part of the curtain wall extending a distance below the water surface and a part extending above the water surface. The most versatile of these flexible booms are supported in the water by means of separately attached floats. Spaced vertical stiffeners are provided to maintain the boom in the necessary vertical position and they are stabilized by means of weights along the bottom submerged edge. These booms are made up and stored in convenient sections, e.g. of about 100 feet length, and when needed are attached together and deployed in the water to surround and contain the oil spill.

In my copending application Ser. No. 70,333 filed Sept. 8, 1970, I have described a boom of the above type which is extremely strong, inexpensive, light and easy to store and handle. It has been proven to be extremely useful in handling many types of spills. However, there have been some difficulties with my prior boom as well as other available booms of this type in that they can be overturned in extremely adverse sea and wind conditions. It is, therefore, the object of the present invention to provide a flexible oil boom system which will have the important properties of my prior system of being inexpensive to produce, easy to handle and yet having sufficient strength to withstand adverse sea and wind conditions and also being very stable against overturning in these adverse sea and wind conditions.

According to my invention a flexible oil boom is produced comprising a curtain wall of sheet material for deploying in a substantially vertical position in the water such that the upper edge thereof is above the water surface and the lower edge thereof is below the water surface. A plurality of substantially vertical stiffening members are positioned in spaced relationship along the length of the curtain wall and these stiffening members are arranged in opposed pairs with the curtain wall sandwiched therebetween. Outrigger members are attached to each side of the boom a short distance below the water line. Each outrigger has an inner end pivotally connected to a stiffening member and an outer end having means for attaching a float member thereto. A restraining member is provided allowing the outrigger to swing between a downward retracted position adjacent the stiffening member and an operating position substantially perpendicular to the stiffening member. Keel members are pivotally connected to the lower ends of the stiffening members on both sides of the curtain wall and these keel members are held by restraining members allowing them to swing between an upper retracted position adjacent the curtain wall and an outwardly and upwardly inclined operating position.

The curtain wall is preferably made from a synthetic fabric such as nylon, and can be coated with a protective coating, such as polyvinyl chloride. Depending on the height of the boom to be made, a single sheet of fabric can be used for the curtain wall or two or more sheets can be joined together. In either situation, it is desirable to provide additional strength in the region of the water line. This can be done by providing a join seam or double thickness of fabric at the desired location and this seam can also have incorporated therein one or more longitudinally extending stiffening ropes, e.g. ½ inch diameter poly-olefin ropes. This strengthened area provides additional strength against damage from floating objects on the water, such as logs and other debris, which might tear through a single thickness of fabric. It also provides additional longitudinal strength against the force of very high wind and heavy seas.

The upper and lower edges of the curtain wall also preferably have overlapped portions forming pockets within which are placed additional strengthening members, e.g. ¾ inch diameter polyolefin ropes.

The vertical stiffening members are preferably aluminum bars and, for instance, 2½ X 1 X 3/16 inches aluminum channels have been found to be very satisfactory. These channel members can be conveniently positioned back to back with the curtain wall sandwiched therebetween and then bolted together.

The outriggers are also preferably formed from aluminum channels and these are preferably restrained by polyolefin ropes. Chains or rigid rods can, of course, also be used as restraining members but the polyolefin rope has been found to be particularly desirable since it increases the buoyancy of the entire boom system.

The keels are preferably formed from narrow panels of fabric held in position by aluminum channel stiffening members connected at one end to the vertical stiffening members. The fabric of the keel is preferably an extension of the curtain wall fabric and the fabric panels are held in an outwardly and upwardly inclined direction by the stiffening members thereby forming a keel or sea anchor for the system. These keel stiffeners can also be restrained in the desired position by means of polyolefin ropes.

With this arrangement of outriggers and keels or sea anchors the flexible boom system of this invention is provided with exceptional stability so that it will remain in the desired position in the water even during very rough seas.

The invention will now be illustrated by the following drawings wherein:

FIG. 3 is a side elevation of a vertical stiffening member; and

FIG. 4 is a side elevation showing a connection between two boom sections.

Figure 2:
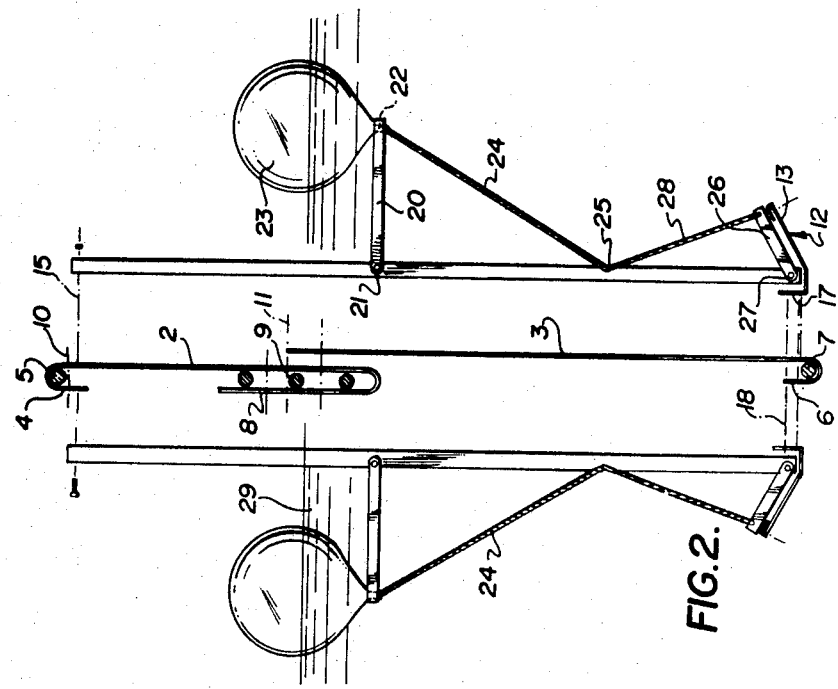
FIG. 2 is an end showing a partially exploded view of a boom according to FIG. 1.
Figure 1:
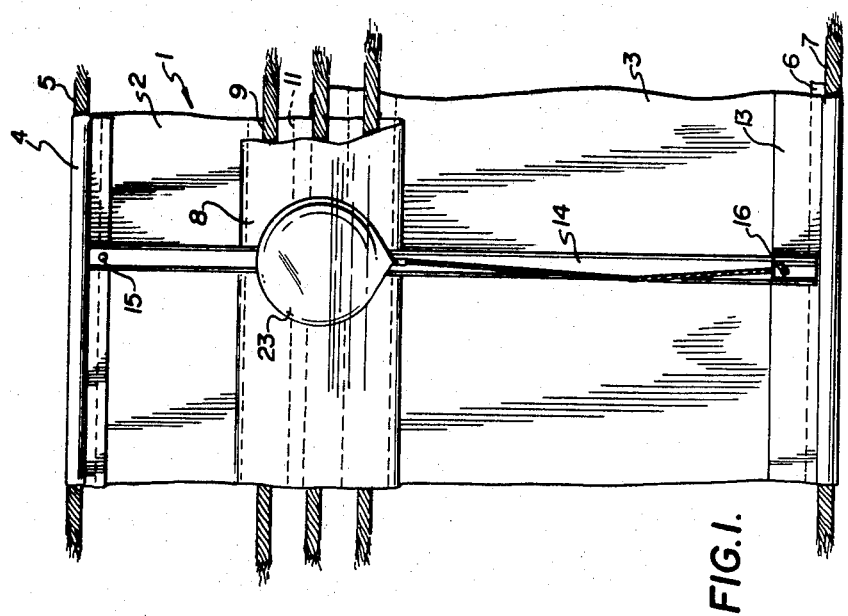
FIG. 1 is a side elevation of a section of a boom according to the invention.

As will be seen particularly from FIGS. 1, 2 and 3, the curtain wall 1 has an upper portion 2 and a lower portion 3. The upper portion 2 has a hem portion 4 at the upper edge which forms a pocket within which is positioned a polypropylene rope 5. The hem 4 is sewn longitudinally along the length of the boom by means of two seams 10.

The lower edge of upper portion 2 includes a large folded back portion 8 which extends to a position slightly above the water line 29 so as to provide a double wall section immediately above and immediately below the water level. This folded back portion 8 is stitched to the main upper portion 2 by means of a series of longitudinally extending seams 11. Also sewn into the overlapping section are a series of polypropylene ropes 9 which serve to increase the strength of the curtain wall in the region of the water level.

The lower curtain wall portion 3 overlaps the lower edge of the upper curtain wall portion 2 and is also joined thereto by means of the seams 11. The lower edge of lower curtain wall portion 3 also includes a hem portion 6 forming a longitudinal pocket to hold polypropylene rope 7. This hem portion 6 is sewn by means of seams 16. Also sewn to the hem portion 6 are a pair of long thin strips of fabric 13 which form the keels or sea anchors. The same fabric can be used for these keel portions as are used for the main portion of the curtain wall.

Vertical stiffening members 14 are in the form of aluminum channels having the dimensions of 2½ × 1 × 3/16 inches. These are placed back to back with the curtain wall held between as shown in FIG. 2 and are bolted together at top and bottom by means of bolts 15 and 16.

An outrigger 20 is connected to each stiffening member 14 and each outrigger is in the form of an aluminum channel having the dimensions of 1⅝ × ¾ × ⅛ inches. Each outrigger is mounted at one end to the vertical member 14 by means of a ⅜ inch aluminum rivet 21 and is held at the outer end from upward movement beyond a position perpendicular to the vertical member by means of a polypropylene rope 24 which is connected to the vertical stiffening member at 25. A toggle 22 is also provided for attaching a float member 23. With this arrangement of outriggers it will be seen that when the floats 23 are not attached the outriggers 20 will simply swing down into the channels 14 and are completely out of the way of folding and storing of the boom. Also, by providing flexible stays 24 it will be seen that as the boom moves in wave action, floats on both sides of the boom will always tend to be in full contact with the water.

The keel or sea anchor strips 13 are stiffened by means of aluminum stiffening members 26 which are made from the same stock as the outriggers 20 and are pivoted at one end to the vertical channels 14 by means of ⅜ inch aluminum rivets 27. The fabric 12 is attached to these stiffening members 26. The stiffening members are then held against downward movement beyond the position shown in FIG. 2 by means of polypropylene ropes 28 which are connected to the vertical members 14 at point 25. Thus, when the boom is not in use the stiffening members 26 simply fold into the channels 14 so that they in no way interfere with the folding and storage of the boom and then when the boom is deployed in the water the keels assume the position shown in FIG. 2 and resist any upward movement of the boom.

With this particular construction, the inherent features of the construction give adequate stability but if greater stability is desired then the usual forms of additional weights such as chains or lead weights can be added to the lower sections of the system.

To make up a totally operational boom, lengths must be connected together and the connecting arrangement can be seen from FIG. 4. End hems 30 are provided on the curtain walls in the usual manner. A series of shackles 31 and 32 are then mounted in these end hems with the shackles 31 being connected directly to the longitudinal strengthening ropes 5, 7 and 9. The shackles 32 simply pass through holes in the end hems 30. In order to join two sections of the boom together, they are simply brought into alignment as shown in FIG. 4 and aluminum rod 33 is passed down through the shackles thus securely connecting the two sections of boom together. In order to provide a good seal at these connecting points, the end hems 30 are arranged with an overlapping flap of a length of about 3 feet on each side of the connection.

The embodiments of the invention in which an exclusive property or privilege is claimed are defined as follows:

1. A flexible boom for catching and collecting residues from the surface of bodies of water, comprising a curtain wall of sheet material for deploying in a substantially vertical position in the water such that the upper edge thereof is above the water surface and the lower edge thereof is below the water surface, a plurality of substantially vertical stiffening members positioned in spaced relationship along the length of the curtain wall, said stiffening members being arranged in opposed pairs with the curtain wall sandwiched therebetween, outrigger members on each side of the boom, each outrigger having an inner end pivotally connected to a stiffening member and an outer end having means for connecting a float thereto, a flexible restraining member connected diagonally between an outer region of each outrigger and a region of the stiffening member below the outrigger pivotal connection thereto allowing said outrigger to swing between a downward position adjacent the stiffening member and a position substantially perpendicular to the stiffening member, and keel members pivotally connected to the lower ends of said stiffening members on both sides of the curtain walls, said keels being held by flexible restraining members connected diagonally between an outer region of each keel and a region of the stiffening member above the keel pivotal connection thereto allowing them to swing between an upper retracted position adjacent the curtain walls and an upwardly and outwardly inclined operating position.

2. A flexible boom according to claim 1 wherein said stiffening members are aluminum channel members.

3. A flexible boom according to claim 2 wherein the outriggers are aluminum channel members.

4. A flexible boom according to claim 3 wherein the restraining member for the outrigger is a polyolefin rope.

5. A flexible boom according to claim 4 wherein said keel members are fabric panels sewn to the curtain wall and held in place by the keel stiffening members.

6. A flexible boom according to claim 5 wherein the restraining member is a polyolefin rope.

7. A flexible boom according to claim 1, wherein the fabric is PVC coated nylon.

8. A flexible boom according to claim 1 wherein the upper and lower edges of the curtain wall are strengthened by hem pockets containing polyolefin ropes.

9. A flexible boom according to claim 8 wherein the portion of the curtain wall in the region of the water line is reinforced by a double thickness of fabric with longitudinally extending polyolefin ropes in the double thickness region.

* * * * *